United States Patent [19]

Lu

[11] Patent Number: 5,561,599
[45] Date of Patent: Oct. 1, 1996

[54] METHOD OF INCORPORATING INDEPENDENT FEEDFORWARD CONTROL IN A MULTIVARIABLE PREDICTIVE CONTROLLER

[75] Inventor: Z. Joseph Lu, Glendale, Ariz.

[73] Assignee: Honeywell Inc., Minneapolis, Minn.

[21] Appl. No.: 490,183

[22] Filed: Jun. 14, 1995

[51] Int. Cl.$^6$ .................................................. G05B 13/02
[52] U.S. Cl. ........................................... 364/164; 364/165
[58] Field of Search ..................................... 364/164, 165

[56] References Cited

U.S. PATENT DOCUMENTS

| | | | |
|---|---|---|---|
| 5,347,447 | 9/1994 | Kiji et al. | 364/152 |
| 5,351,184 | 9/1994 | Lu et al. | 364/165 |
| 5,396,416 | 3/1995 | Berkowitz et al. | 364/165 |
| 5,424,942 | 6/1995 | Dong et al. | 364/164 |
| 5,457,625 | 10/1995 | Lim et al. | 364/149 |
| 5,488,561 | 1/1996 | Berkowitz et al. | 364/165 |
| 5,504,672 | 4/1996 | Hardiman et al. | 364/165 |

*Primary Examiner*—Roy N. Envall, Jr.
*Assistant Examiner*—Yoncha Kundupoglu
*Attorney, Agent, or Firm*—Arthur A. Sapelli

[57] ABSTRACT

A process control system having a feedback controller, at least one manipulated variable and one controlled variable with a feedforward loop is provided. Independent feedforward control is incorporated into the feedback controller by defining a feedforward control funnel and a feedback control funnel for each controlled variable, specifying a time $T_{FF}$ in which the disturbance is to be eliminated and a time $T_{FB}$ in which the controlled variable is to reach a steady state value, respectively. The shorter of the feedforward control funnel and the feedback control funnel is selected. If $T_{FF}$ is less than $T_{FB}$, the feedback control speed is compensated such that the feedback controller speed is not increased. If $T_{FF}$ is greater then or equal to $T_{FB}$, no compensation is performed, thereby effectively providing independent tuning parameters for the feedforward control solution and the feedback control solution. New values of the controlled variables are calculated and the process controlled by the newly calculated controlled variables.

4 Claims, 4 Drawing Sheets

METHOD OF INCORPORATING INDEPENDENT FEEDFORWARD CONTROL IN A MULTIVARIABLE PREDICTIVE CONTROLLER

BACKGROUND OF THE INVENTION

The present invention relates to control systems, and more particularly, to a method of incorporating independent feedforward control in a multivariable predictive controller.

In current control systems which includes feedforward control, a classical approach of handling the feedforward control is to include two controllers, a feedback (FB) controller and a feedforward (FF) controller, each controller having its own set of tuning parameters. In some systems currently available, a single feedback controller is utilized, and the errors of the feedback loop are combined with the disturbance error of the feedforward loop. A single corrective solution is generated by the FB controller which outputs moves to eliminate the feedback error and the feedforward disturbance effects. The single feedback controller has a single set of turning parameters thereby limiting the speed at which the effects of the disturbance can be canceled. If the speed of the controller is increased to increase the speed at which the disturbance is eliminated, the stability margin of the feedback controller is decreased. The feedforward control speed can be pushed faster than the feedback controller speed because the feedforward controller is an open loop control, i.e., the feedforward is inherently stable in its operation as long as the feedforward models are stable, whereas feedback control can become unstable if the control speed is pushed too hard. If the feedforward control is designated to go faster, there is no possibility of running into an unstable condition. If the user tunes the feedback controller to run faster, care must be taken to insure that the feedback controller doesn't get into an unstable condition. Thus the desire to have independent tuning parameters for the feedback and feedforward controller. A multivariable predictive controller, utilizing two control algorithms to perform a feedback and feedforward control in a single controller burns up too much CPU time. Thus, it is desired to provide a multivariable predictive controller such that the feedback controller combines the feedforward action with the feedback action and has separate independent tuning, one set of tuning parameters for the feedback control and one set of tuning parameters for the feedforward control.

Thus there is provided by the present invention a method of incorporating independent feedforward control in the feedback controller of a multivariable predictive controller.

SUMMARY OF THE INVENTION

Therefore, there is provided by the present invention a method of incorporating independent feedforward control in a multivariable predictive controller. A process control system includes a feedback controller, and also includes at least one manipulated variable (mv) and at least one controlled variable (cv). The process control system also includes a feedforward loop, the process control system being subject to a disturbance. A method of the present invention incorporates independent feedforward control in the feedback controller and comprises the steps of defining a feedforward control funnel for each controlled variable and a feedback control funnel for each cv. The feedforward control funnel specifies a first time, $T_{FF}$, in which the disturbance is to be eliminated, and a second time, $T_{FB}$, in which a controlled variable is to reach a steady state value in response to an input change. The shorter of the feedforward control funnel and the feedback control funnel is selected for each cv. If the first time, $T_{FF}$, is less than the second time, $T_{FB}$, the feedback control speed is compensated such that the feedback controller speed is not increased. If $T_{FF}$ is greater than or equal to $T_{FB}$ no compensation is performed, thereby effectively providing independent tuning parameters for the feedforward control solution and the feedback control solution. New values of the controlled variables are calculated in accordance with the control procedure of the feedback controller, the process being controlled in accordance with the newly calculated solution.

Accordingly, it is an object of the present invention to provide a method of incorporating feedforward control in a controller.

It is another object of the present invention to provide a method of incorporating independent feedforward control in a controller.

It is still another object of the present invention to provide a method of incorporating independent feedforward control in a multivariable predictive controller.

These and other objects of the present invention will become more apparent when taken in conjunction with the following description and attached drawings, wherein like characters indicate like parts, and which drawings form a part of the present application.

BRIEF DESCRIPTION OF THE DRAWINGS

FIGS. 3A and 3B, shows an example feedback control funnel and an example feedforward control funnel, respectively.

DETAILED DESCRIPTION

Before describing the method of the present invention, it will be helpful in understanding a system environment in which the present invention is utilized.

Figure 1:
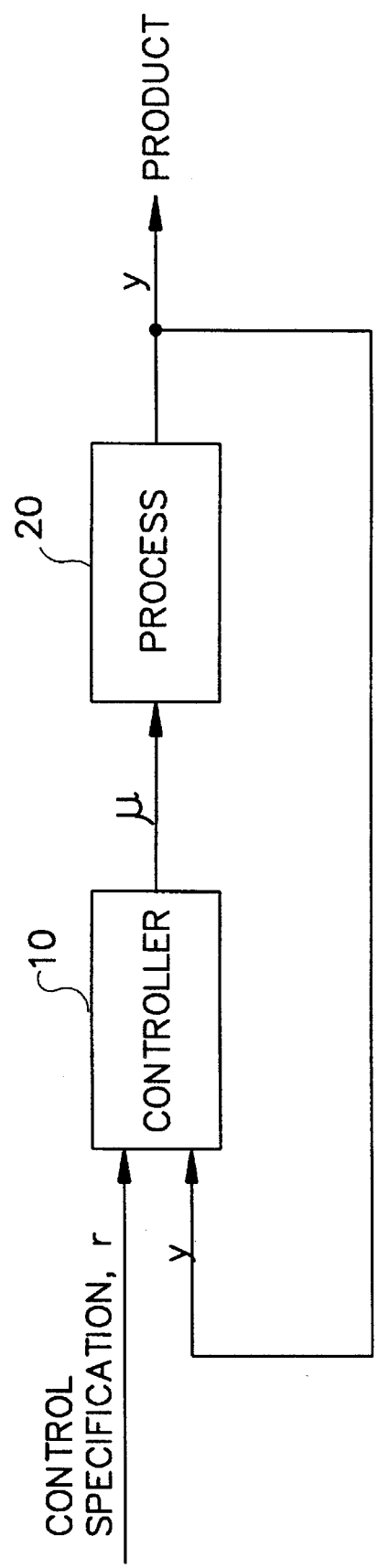
FIG. 1 shows a functional block diagram of a process control system in which the present invention can be utilized.

Referring to FIG. 1, there is shown a functional block diagram of a process control system in which the present invention may be utilized. A controller 10 has multiple outputs, which are coupled as input variables u to a process 20. The process 20 can include, for example, a plurality of elements which can be controlled such as valves, heaters, . . . Process variables y of process 20 include temperature, pressure, level, flow, . . . which govern product quality. The input variables (or manipulated variables) u, are defined as:

$$u = \begin{bmatrix} u_1 \\ u_2 \\ \cdot \\ \cdot \\ \cdot \\ u_m \end{bmatrix} \text{ or } mv = \begin{bmatrix} mv_1 \\ mv_2 \\ \cdot \\ \cdot \\ \cdot \\ mv_m \end{bmatrix}$$

and the output variables (or controlled variables) cv, are defined as:

$$cv = \begin{bmatrix} cv_1 \\ cv_2 \\ \cdot \\ \cdot \\ \cdot \\ cv_n \end{bmatrix}$$

Thus, the process 20 is a dynamic process P(s) having m manipulated variables and n controlled variables. The controlled variables (cv) include $n_1$ regulated cv, n2 restrained cv, and n3 optimized cv. Generally, $$n \geq m \geq n_1$$

In the present invention, the control specification, r, (this is referred to as setpoint in previous systems) is defined as follows:

$$r = \begin{bmatrix} r_1 \in [\underline{r}_1, \overline{r}_1] \\ r_2 \in [\underline{r}_2, \overline{r}_2] \\ \cdot \\ \cdot \\ \cdot \\ r_n \in [\underline{r}_n, \overline{r}_n] \end{bmatrix}$$

For the regulated $cv_i$, the lower bound is equal to the upper bound, $\underline{r}_i = \overline{r}_i$. For the restrained $cv_j$, the upper bound is greater than the lower bound, $\overline{r}_j \geq \underline{r}_j$, or there is either a lower bound only or there is an upper bound only. Finally, for the optimized cv, there is no bound at all.

The range control function of controller 10 is formulated to handle the three cases identified above in accordance with:

$$\min_{x,y} \left\| 1/2 \, W(Ax - y) \right\|_2$$

Subject to:

$\underline{MV} \leq x \leq \overline{MV}$, and $\underline{PV} \leq y \leq \overline{PV}$;

where, W is a user weighing matrix;

A is a dynamic model matrix ($a_{ij}$ coefficients) that relates the process dynamics of an output to an input; y (optimal response trajectory) are range variables (extension of setpoint); and x (the control solution) is the manipulated variable $\Delta u$ (i.e, $\Delta u = u_{CURRENT} - u_{LAST}$), depending on the application. $\underline{PV}$ and $\overline{PV}$ (process variable) is the range it is desired to have the process operate, and $\underline{MV}$ and $\overline{MV}$ is the range physical limits it is desired to have the process operate.

A more detailed description of the multivariable predictive controller (MPC) can be had by referring to U.S. Pat. No. 5,351,184, issued 27 September 1994, entitled "Method of Multivariable Predictive Control Utilizing Range Control", assigned to the same assignee as the present application and incorporated by reference herein.

The present invention will now be described. In the preferred embodiment of the present invention, feedforward control is included in the process control system utilizing the feedback controller. It is desired not to use two (2) range control procedures (also referenced to herein as the Range Control Algorithm (RCA)) of the controller 10 which is fully described in the aforementioned patent, U.S. Pat. No. 5,351,184, because the CPU time would be doubled. The preferred embodiment of the present invention utilizes the same RCA and uses the same single controller 10, but achieves an effect of having two different independent controllers.

Figure 2:
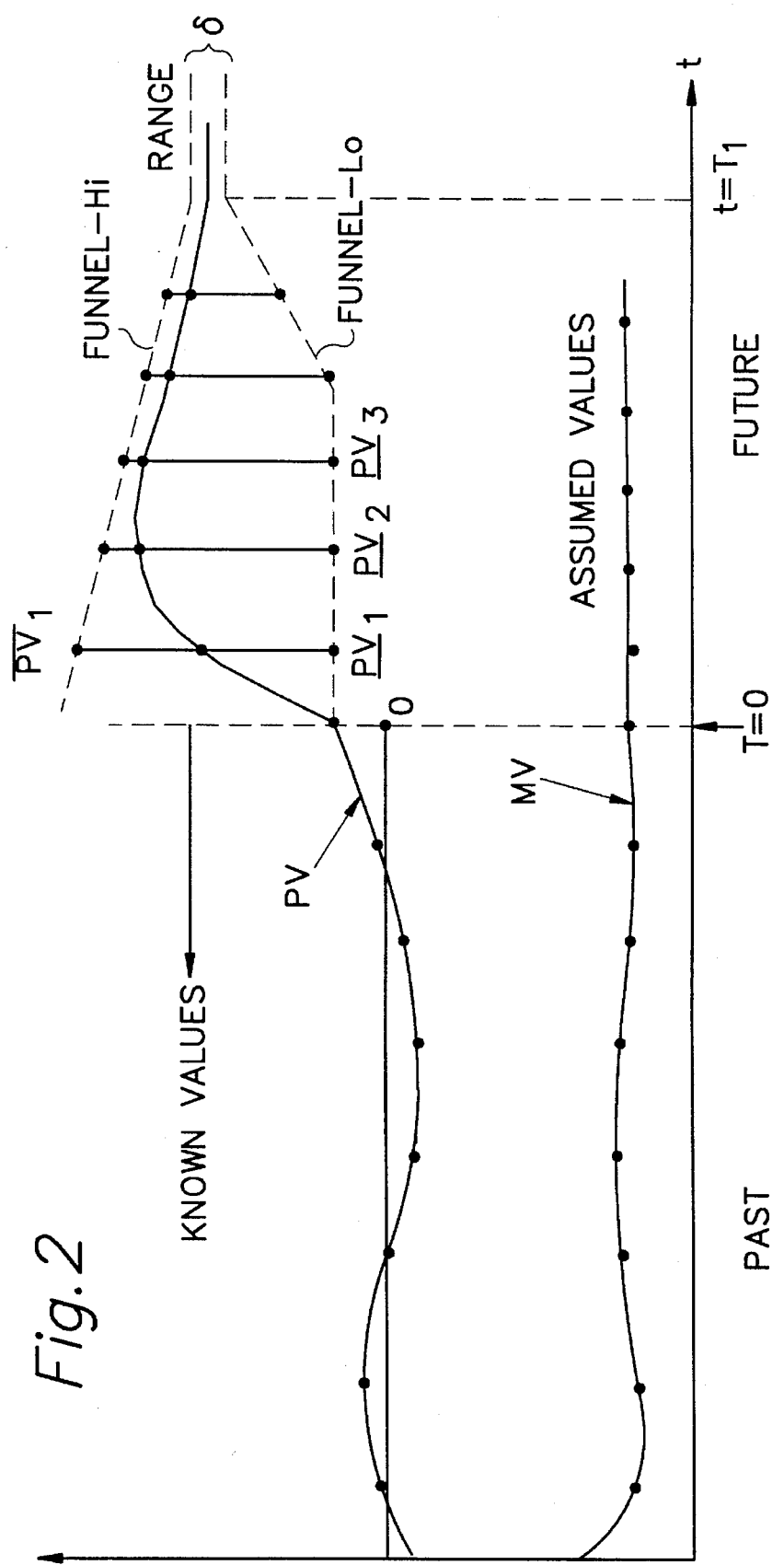
FIG. 2 shows a response curve of a process variable to a change in the setpoint.

Referring to FIG. 2, there is shown a response curve of a process variable, pv (also referred to as controlled variable, cv), to a change in the setpoint, sp. A funnel is defined having points $\overline{PV}_1, \overline{PV}_2 \ldots$ for the upper bounds of the funnel (FUNNEL-HI) and having points $\underline{PV}_1, \underline{PV}_2, \underline{PV}_3, \ldots$ for the lower bounds of the funnel (FUNNEL-LO), such that the process variable reaches the desired value (steady state value) at time $T_1$. The funnel defines a bounds for the response curve. The curve of FIG. 2 shows a range $\delta$ since the multivariable predictive controller of the preferred embodiment of the present invention utilizes range control, more fully described in the aforementioned patent; however, it will be recognized by those skilled in the art that range control is not required for the present invention.

In implementing the present invention, two (2) funnels are defined, a feedback control funnel and a feedforward control funnel. By defining the two funnels, the user can specify a time in which it is desired to reject the effects of disturbance, and the user can also specify a different time in which it is desired to have the cv reach its operational (steady state) value in response to a setpoint change.

Figure 3:
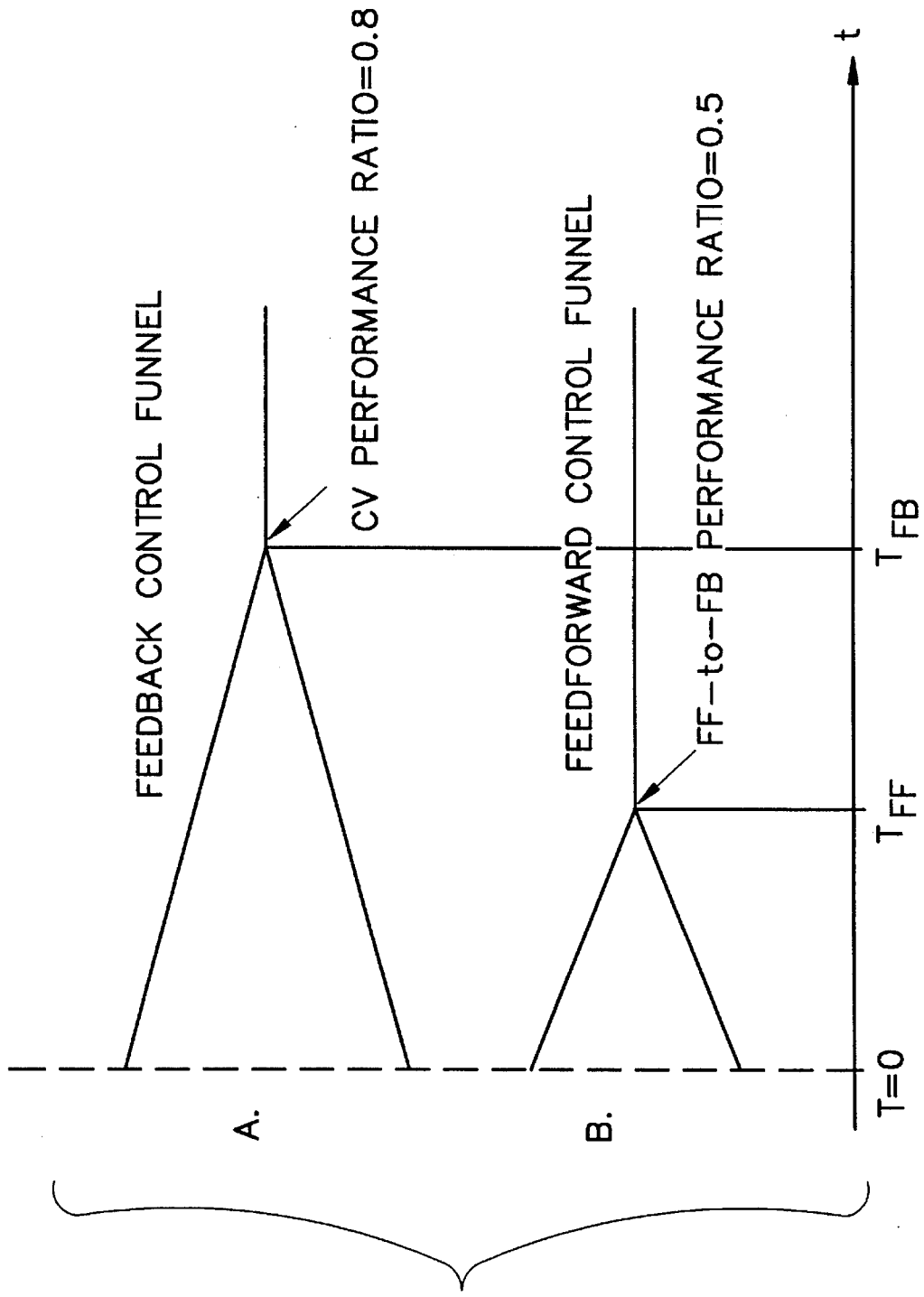
FIG. 3, which comprises

The funnels are defined as shown in FIG. 3, which comprises FIGS. 3A and 3B. FIG. 3A shows an example feedback (FB) control funnel in which the cv reaches its operational value at a time 0.8 (or 80%) of the system open loop response time. Thus a cv performance ratio is defined where:

$$CV \text{ Performance Ratio} = \frac{\text{Close Loop Response Time } (CLRT)}{\text{Open Loop Response Time } (OLRT)}.$$

The 0.8 value, in this example, would be specified by the user. A Feedforward Control Funnel is also specified by the user which defines a Feedforward (FF)-to-Feedback (FB) performance ratio. In the example of FIG. 3B, a FF/FB performance ratio of 0.5 is specified meaning that the feedforward disturbance is rejected within 40% of the open loop response time, i.e., for the example given above in which the cv performance ratio of 0.8 of FIG. 3A is selected.

The controller 10 has inputted the characteristics of the funnels including the time at which the effects of the disturbance is to be eliminated, $T_{FF}$, and the time at which the operational value of the process variable is achieved, $T_{FB}$, the shorter time defining a "shorter funnel". The controller 10 of the preferred embodiment of the present invention uses the shorter of the two funnels. Thus the user's request in rejecting the disturbance effect will be satisfied. (The FF control funnel being the shorter funnel in this example.) However, present day controllers will not satisfy the user's request to satisfy the cv response time for setpoint tracking.

Figure 4:
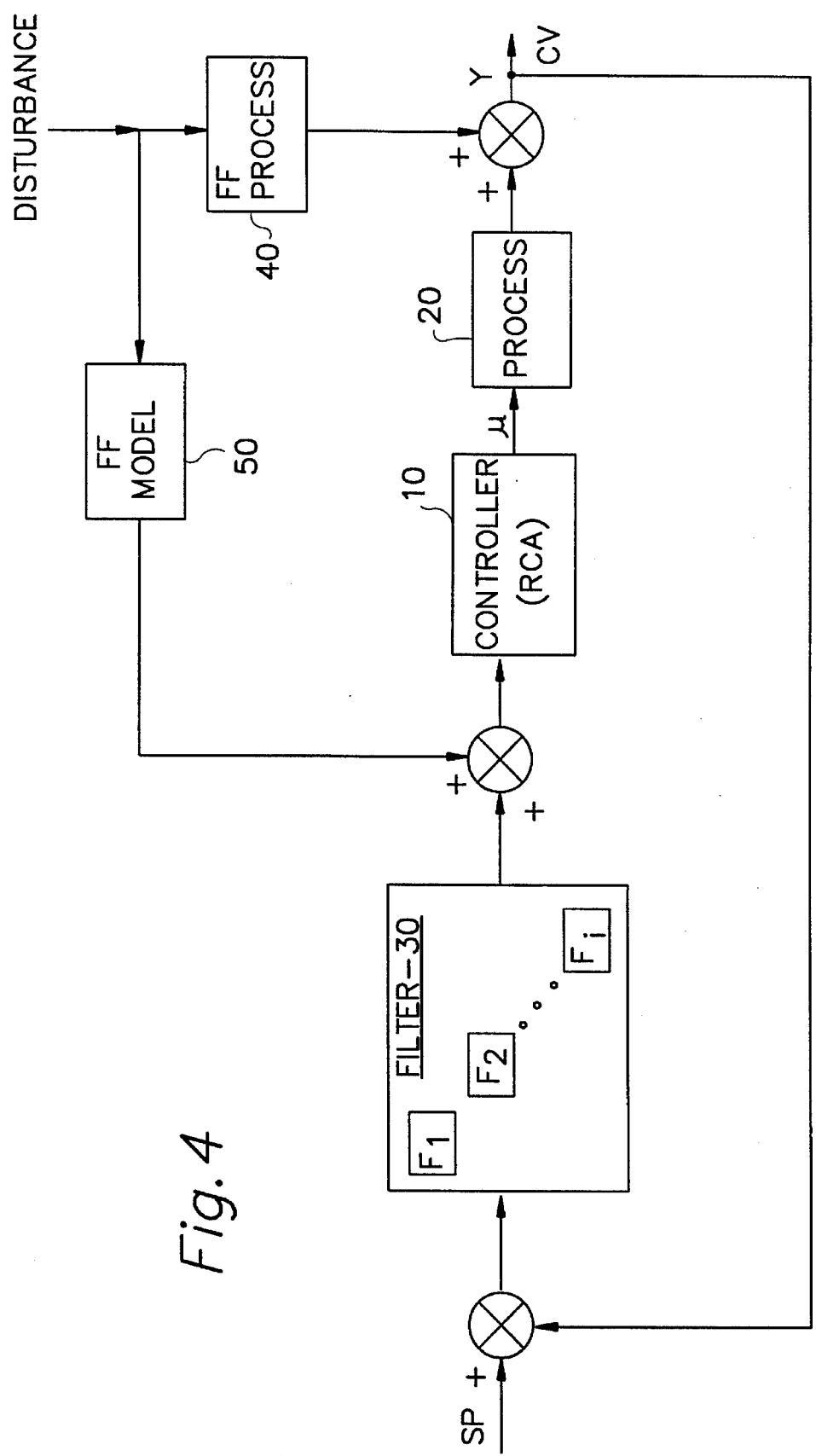
FIG. 4 shows a functional block diagram of the preferred embodiment of the present invention.

In order to satisfy the two time requests, i.e., have independent tuning parameters, the process control system is modified as shown in FIG. 4, i.e., the preferred embodiment of the present invention. The RCA algorithm of the controller 10 is modified to use the shorter of the two funnels for each cv. Thus, the faster controller speed is selected. Further, the system is modified to include a diagonal filter 30, having a filter $F_i$ where i=the number of cvs. The filters, one for each cv, compensate the feedback controller 10 speed as if there was no speedup by the Range Control Algorithm. The filters have the form:

$$F_i = \frac{1}{\tau_i s + 1}.$$

where for FF to FB ratio<1

$$\tau = \exp-\left[\frac{4T_s}{(1-[FF\text{ to }FB\text{ Ratio}])OLRT}\right]$$

and $T_s$=sampling time. For FF to FB ratio$\geq 1$ $\tau_i=0$.

The disturbance is coupled to a FF model 50 (in a manner well known to those skilled in the art), the output being added to the output of the filter for each cv, and the sum inputted to the controller 10. A FF process 40 is included which exhibits an effect of the disturbance on the process and thus the effect on the cv. The output of the FF process 40 is thereby added to the output cv of the process 20, thereby giving a resultant effect on the cvs, in a manner well known to those skilled in the art. Thus there has been shown a process control system which includes a method of incorporating independent feedforward control in a multivariable predictive controller.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

I claim:

1. In a process control system, having a feedback controller, and further having at least one manipulated variable (mv) and at least one controlled variable (cv), and further including a feedforward loop, the process control system subject to a disturbance, a method of incorporating independent feedforward control in the feedback controller comprising the steps of:

a) defining a feedforward control funnel for each controlled variable and a feedback control funnel for each cv, the feedforward control funnel specifying a first time, $T_{FF}$, in which the disturbance is to be eliminated, and a second time, $T_{FB}$, in which a controlled variable is to reach a steady state value in response to an input change;

b) selecting a shorter of the feedforward control funnel and the feedback control funnel for each cv;

c) if the first time $T_{FF}$ is less than the second time $T_{FB}$,
      i) compensating the feedback control speed as if the feedback controller speed were not increased; otherwise if the first time $T_{FF} \geq T_{FB}$, continuing to the next step, thereby effectively providing independent tuning parameters;

d) calculating new values of the controlled variable in accordance with the controller procedure to generate a solution; and e) controlling the process in accordance with the solution, the solution also including the elimination of the disturbance within the specified time.

2. In a process control system, a method of incorporating independent feedforward control according to claim 1, wherein the process control system is a multivariable predictive controller.

3. In a process control system, a method of incorporating independent feedforward control according to claim 2, wherein the controller procedure of the feedback controller is the range control procedure.

4. In a process control system, a method of incorporating independent feedforward control according to claim 3, wherein the step of compensating comprises the step of filtering each controlled variable, $cv_i$, in accordance with $$F_i = \frac{1}{\tau_i s + 1}$$

where $i$=index of cv and for a feedforward to feedback ratio <1

$$\tau_i = \exp\left[\frac{-4T_s}{[1-(FF\text{ to }FB\text{ Ratio})](OLRT)}\right]$$

where $T_s$=sampling time

OLRT=open loop response time and for a feedforward to feedback ration$\geq 1$ $\tau_i=0$.

* * * * *